United States Patent
Goldberg et al.

(10) Patent No.: US 8,060,817 B2
(45) Date of Patent: Nov. 15, 2011

(54) DATA VIEWER

(75) Inventors: Joseph H. Goldberg, San Carlos, CA (US); Luke Kowalski, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 10/985,531

(22) Filed: Nov. 9, 2004

(65) Prior Publication Data

US 2006/0101324 A1   May 11, 2006

(51) Int. Cl.
*G06F 17/00* (2006.01)

(52) U.S. Cl. ........ 715/212; 715/200; 715/201; 715/214; 715/213; 715/215; 715/216; 715/217; 715/218; 715/219; 715/220

(58) Field of Classification Search .................. 715/503, 715/504, 500, 200, 212–220, 201
See application file for complete search history.

(56) References Cited

U.S. PATENT DOCUMENTS

| | | | | |
|---|---|---|---|---|
| 5,255,356 | A * | 10/1993 | Michelman et al. | 715/504 |
| 5,632,009 | A | 5/1997 | Rao et al. | |
| 5,657,437 | A * | 8/1997 | Bishop et al. | 715/203 |
| 5,880,742 | A | 3/1999 | Rao et al. | |
| 5,883,635 | A * | 3/1999 | Rao et al. | 345/440 |
| 5,884,306 | A * | 3/1999 | Bliss et al. | 1/1 |
| 5,970,493 | A | 10/1999 | Shoup et al. | |
| 6,085,202 | A | 7/2000 | Rao et al. | |
| 6,205,453 | B1 | 3/2001 | Tucker et al. | |
| 6,317,750 | B1 * | 11/2001 | Tortolani et al. | 1/1 |
| 6,626,959 | B1 * | 9/2003 | Moise et al. | 715/210 |
| 6,628,312 | B1 | 9/2003 | Rao et al. | |
| 6,775,675 | B1 * | 8/2004 | Nwabueze et al. | 707/100 |
| 7,062,502 | B1 | 6/2006 | Kesler | |
| 7,379,934 | B1 * | 5/2008 | Forman et al. | 707/809 |
| 7,401,094 | B1 | 7/2008 | Kesler | |
| 2002/0069221 | A1 | 6/2002 | Rao et al. | |
| 2002/0091728 | A1 * | 7/2002 | Kjaer et al. | 707/503 |
| 2005/0289455 | A1 * | 12/2005 | Hays et al. | 715/513 |
| 2006/0085744 | A1 * | 4/2006 | Hays et al. | 715/530 |
| 2006/0129913 | A1 * | 6/2006 | Vigesaa et al. | 715/503 |
| 2006/0288284 | A1 | 12/2006 | Peters et al. | |

(Continued)

OTHER PUBLICATIONS

Blattner, "Special Editing Using Microsoft Office Excel 2003", Sep. 11, 2003m Que, pp. 1-8.*

(Continued)

*Primary Examiner* — Cesar Paula
*Assistant Examiner* — David Faber
(74) *Attorney, Agent, or Firm* — Kilpatrick Townsend & Stockton LLP

(57) ABSTRACT

Methods, systems, and machine readable mediums are disclosed for viewing multidimensional data. In one embodiment, a method is disclosed which comprises displaying multidimensional data in a table format, the table format having a plurality of rows, a plurality of columns, and a plurality of cells displaying data, a first column of the plurality of columns including data having at least two hierarchical levels. Data for at least a first set of the plurality of cells is displayed in a graphical format, the first set including cells in the first column, the graphical format of the cells in the first set in the first column indicating a hierarchical level associated with the cell data and a mechanism is displayed for a first one of the rows to display at least one additional row having data in the first column associated with a lower hierarchical level of the first row data.

32 Claims, 9 Drawing Sheets

U.S. PATENT DOCUMENTS

2007/0101252 A1    5/2007    Chamberlain et al.

OTHER PUBLICATIONS

Microsoft, "Microsoft Excel 2000", 1999, Microsoft, FIGs 1-17b (44 pages).*

Microsoft, "Microsoft Excel 2000", 1999, Microsoft, FIGs 19(a-j) (10 pages).*

Microsoft, "Microsoft Excel 2000", 1999, Microsoft, FIG 20(a-t), 21a-b, 22a-c & pp. 1-2 (27 pages total).*

Microsoft, "Microsoft Excel 2000", 1999, Microsoft, FIG 23(a-u), 24a-b, & p. 3 (24 pages total).*

ILOG JViews Visualization Products, http://www.ilog.com/products/jviews, Apr. 29, 2005 ILog, Inc. pp. 1-2.

Keizer, George, "Microsoft Office Systems—CNET Reviews", Oct. 21, 2003, CNET, pp. 1-18.

Microsoft, "Microsoft Excel 2003", Microsoft, FIG 0-10b, initially cited by Examiner on Apr. 21, 2011 in U.S. Appl. No. 12/241,116, 24 pages.

\* cited by examiner

FIGURE 6

Expand Hierarchy / Collapse Hierarchy    Show Only Checked Rows

Configure Display

630 — Reset Table

| | Target | # Children | # Descendants | Availability | Ave. Response Time ms | Slowest Response Time ms | Stat |
|---|---|---|---|---|---|---|---|
| ☑ | My Bike Shop | 14 | 28 | 0037 | 0992 | 2033 | 0002 |
| ☑ | Storefront Page | 4 | 4 | 0025 | 0784 | 1633 | 0001 |
| ☑ | Browse Wheel Repair Info | 0 | 0 | 0036 | 0489 | 0986 | 0001 |
| ☑ | App19 | 0 | 0 | 0007 | 0915 | 1848 | 0002 |
| ☑ | App11 | 0 | 0 | 0072 | 0664 | 1764 | 0001 |
| ☑ | App26 | 0 | 0 | 0088 | 0757 | 1605 | 0001 |
| ☑ | App3 | 0 | 0 | 0007 | 0340 | 0772 | 0002 |

600
602
612
614
622
624
610

DATA VIEWER

BACKGROUND OF THE INVENTION

Data may be displayed in any number of different ways. One traditional approach that has been used to display data is a tabular representation. In a tabular representation, data is displayed in a table format with records displayed as rows in the table and attributes of the records displayed as columns. The attribute values are displayed in a textual format in cells (the intersection of a row and a column). With large data sets, a user has to scroll through multiple pages to view all the data. Additionally, this type of view does not facilitate rapid user comprehension of the data set.

Another technique that has been used is to display data in a table format, but instead of displaying the data values as textual values, the data is displayed as graphical bars. To get more detailed information, the user may specify a focus region to see the textual values of the data. This technique may allow a user to view large amounts of data on a single screen and more easily notice data trends with data sets having two dimensions of data. However, this type of display does not provide for the comprehension of hierarchical relationships in multidimensional data having multiple hierarchical levels.

BRIEF SUMMARY OF THE INVENTION

Methods, systems, and machine readable mediums are disclosed for viewing multidimensional data. In one embodiment, a method is disclosed which comprises displaying multidimensional data in a table format. The table format has a plurality of rows, a plurality of columns, and a plurality of cells displaying data. One column of the plurality of columns includes data for at least two hierarchical levels. Data for at least a first set of the plurality of cells is displayed in a graphical format. The first set includes cells in the first column and the graphical format of the cells in the first column indicates a hierarchical level associated with the cell data. By way of example, the graphical format may comprise graphical bars and the graphical bars may be indented to indicate the hierarchical level of the data in the first column. The method also comprises displaying a mechanism for a first one of the rows to display at least one additional row having data in the first column associated with a lower hierarchical level of the first row data.

The method may also comprise detecting an activation of the mechanism associated with a first one of the rows. The first row has data in the first column at a first hierarchical level. One or more additional rows are then displayed. The additional row(s) have data in the first column at a lower hierarchical level than the first hierarchical level and the data at the lower hierarchical level shares at least one data dimension with the data in the first cell data. In some embodiments, the one or more additional rows are displayed in the graphical format and the graphical format for data in the first column of the row(s) may indicate the lower hierarchical level. A mechanism associated with the first row may also be displayed to remove the one or more additional rows from the displayed data. Optionally, the user may select to expand or collapse all hierarchical levels of the displayed data and the data may be re-displayed in accordance with the user selection.

In some instances, the method may also comprise displaying the data for a second set of the plurality of cells in a textual format. The second set may include non-contiguous rows. Before the second set is displayed in the textual format, it may first be displayed in a graphical format. Upon detecting a selection of the second set, the table may be re-displayed to display the second set in the textual format. Alternately or additionally, the method may comprise detecting a selection of a row having data in the first set which is graphically represented. The data associated with the selected row may then be displayed in a textual format in a status line.

In other embodiments, the method may further comprise invoking a configuration interface having a plurality of configuration options for a user to change a configuration of the displayed data. After a selection is received from a user to change a display mode configuration option, the data may be re-displayed in accordance with the selection. For example, one configuration option may be to display the data in the first set in the graphical format with textual values. As another example, configuration option(s) may be provided to set minimum/maximum threshold values for data. Data that exceeds a maximum threshold value or is less than a minimum threshold value may be displayed in a different format. Another configuration option may be to display the data in a list format, so that when data is resorted the hierarchical relationships between the rows is not maintained. Additional configuration options may be provided to change a top hierarchy level so that data above the top hierarchy level are not displayed; to set the columns that are to be displayed; to display a number of descendents of a row; to change the graphical format (e.g., change the height or spacing of graphical bars); or to right-justify the graphical data of a column.

Other variations of the method are also contemplated. By way of example, the method may further include receiving a sort column selection. The data at a first hierarchical level may be sorted in accordance with the sort column selection and the sorted data may be displayed to maintain a display of the hierarchical relationship between rows of data. As another example, the method may include receiving a selection of one or more rows and re-displaying the table to include only the selected rows.

In another embodiment, a method is disclosed which comprises displaying multidimensional data in a table format. The table format has a plurality of rows, a plurality of columns, and a plurality of cells displaying data. A first column of the plurality of columns includes data for at least two hierarchical levels. The data for at least a first set of the data is displayed in a graphical bar format The graphical bars in the first column are indented to indicate the hierarchical level associated with the data in the first column. A selection of a subset of the first set is detected and the data for the subset is re-displayed in a textual format. The method also comprises detecting a selection of a row in the first set and displaying the data associated with the selected row in a textual format in a status line.

The methods may be also be embodied in computer systems. The computer system may include a display, a processor, and memory communicatively coupled with the processor. The memory may include instructions, which, when executed by the processor cause the processor to display data in accordance with the embodiments described above. The computer system may also comprise data storage to store the data.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which:

FIG. 6 illustrates a third exemplary display of data using a data viewer.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
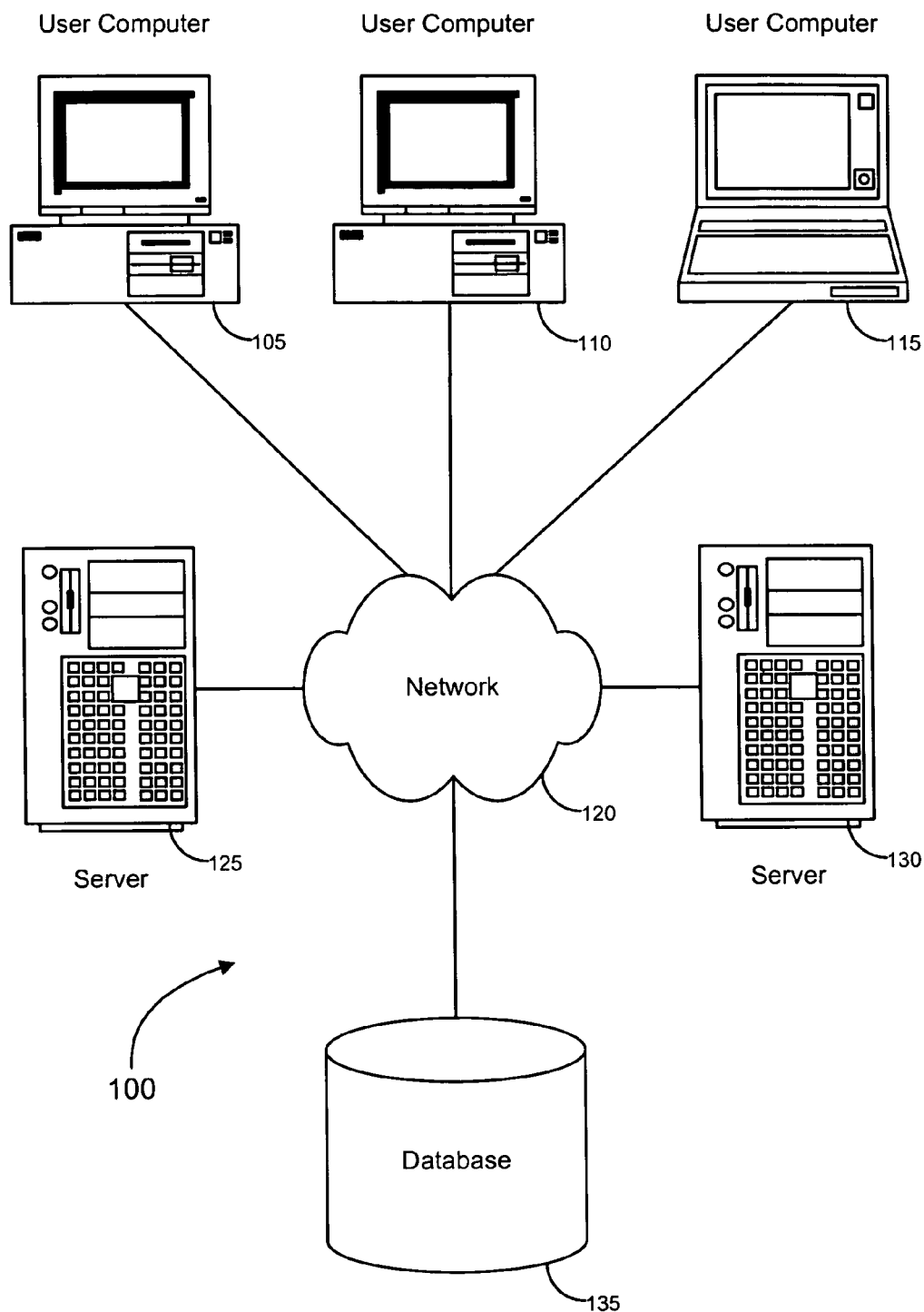
FIG. 1 is a block diagram of an exemplary computer network system environment in which a data viewer may be used.

FIG. 1 illustrates a block diagram of a system environment that may in which a data viewer may be used. The system 100 includes one or more user computers 105, 110, and 115. The user computers 105, 110, and 115 can be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110, 115 may also have any of a variety of applications, including for example, database client and/or server applications, and web browser applications. Alternatively, the user computers 105, 110, and 115 may be any other electronic device, such as a thin-client computer, Internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers may be supported.

In some embodiments, the system 100 may also include a network 120. The network may can be any type of network familiar to those skilled in the art that can support data communications using any of a variety of commercially-available protocols, including without limitation TCP/IP, SNA, IPX, AppleTalk, and the like. Merely by way of example, the network 120 maybe a local area network ("LAN"), such as an Ethernet network, a Fiber Channel network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 125, 130. One server may be a web server 125, which may be used to process requests for web pages or other electronic documents from user computers 105, 110, and 120. The web server can be running an operating system including any of those discussed above, as well as any commercially-available server operating systems. The web server 125 can also run a variety of server applications, including HTTP servers, FTP servers, CGI servers, database servers, Java servers, and the like.

The system 100 may also include one ore more file and or/application servers 130, which can, in addition to an operating system, include one or more applications accessible by a client running on one or more of the user computers 105, 110, 115. The server(s) 130 may be one or more general purpose computers capable of executing programs or scripts in response to the user computers 105, 110 and 115. As one example, the server(s) 130 may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 130 may also include database servers, including without limitation those commercially available from Oracle, Microsoft, Sybase™ IBM™ and the like, which can process requests from database clients running on a user computer 105, 110, 115.

In some embodiments, an application server 130 may create web pages dynamically for displaying user data. The web pages created by the web application server 130 may be forwarded to a user computer 105 via a web server 125. Similarly, the web server 125 can receive web page requests and/or input data from a user computer 105 and can forward the web page requests and/or input data to the web application server 130. In alternate embodiments, application server 130 may implement a Graphical User Interface (GUI), other than a web application, to display data.

In further embodiments, the server 130 may function as a file server. Although for ease of description, FIG. 1 illustrates a separate web server 125 and file/application server 130, those skilled in the art will recognize that the functions described with respect to servers 125, 130 may be performed by a single server and/or a plurality of specialized servers, depending on implementation-specific needs and parameters.

The system 100 may also include a database 135. The database 135 may reside in a variety of locations. By way of example, database 135 may reside on a storage medium local to (and/or resident in) one or more of the computers 105, 110, 115, 125, 130. Alternatively, it may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g™, that is adapted to store, update, and retrieve data in response to SQL-formatted commands.

Figure 2:
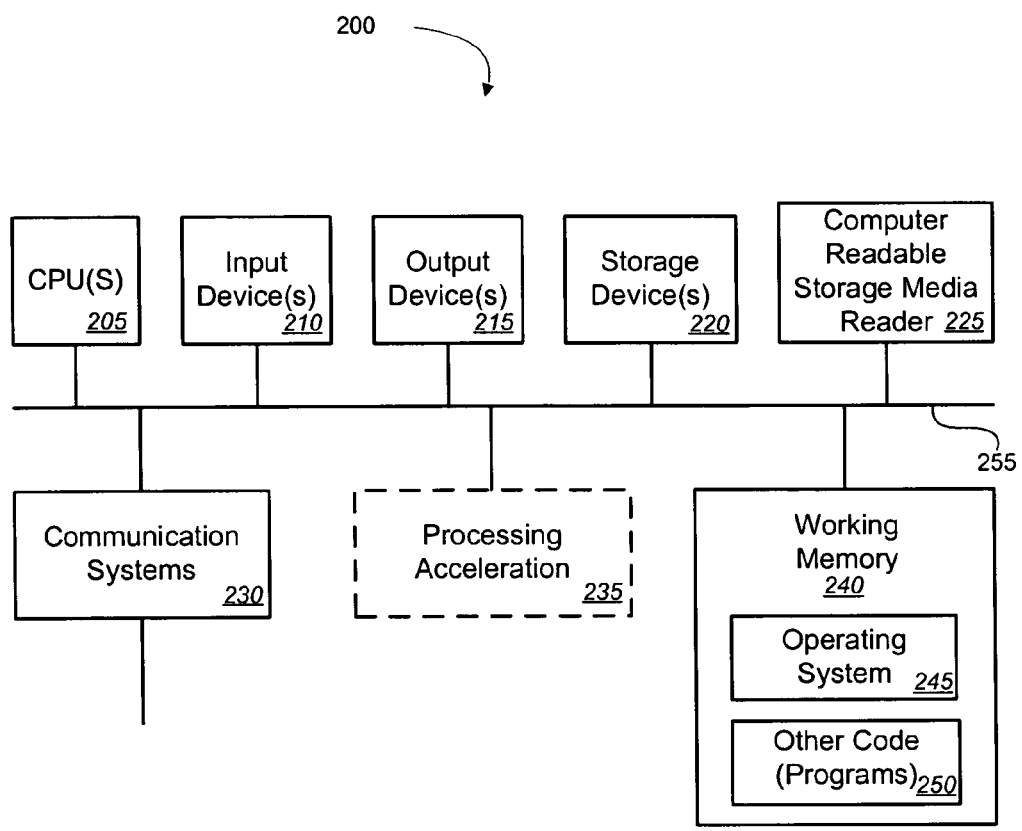
FIG. 2 is a block diagram of a computer system upon which a data viewer or components of a data viewer may be implemented.

FIG. 2 illustrates one embodiment of a computer system 200 upon which a data viewer or components of a data viewer may be implemented. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a wireless or wired network card, an infra-red communication device, etc.); and working memory 240, which may include RAM and ROM devices as described above. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device (s) 220) comprehensively representing remote, local, fixed, and/or removable storage devices plus storage media for temporarily and/or more permanently containing computer-readable information. The communications system 230 may permit data to be exchanged with a network and/or any other computer.

The computer system 200 may also comprise software elements, shown as being currently located within a working memory 240, including an operating system 245 and/or other code 250, such as an application program. It should be appreciate that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

FIGS. 3-7 illustrate different exemplary data views that may be provided by a data viewer. For purposes of illustration, these figures illustrate a particular example of a type of data that may be displayed, that of data related to web site performance. It should be appreciated that the illustrations are exemplary in nature and that data viewers may be used to view a wide variety of other types of data.

Figure 3:
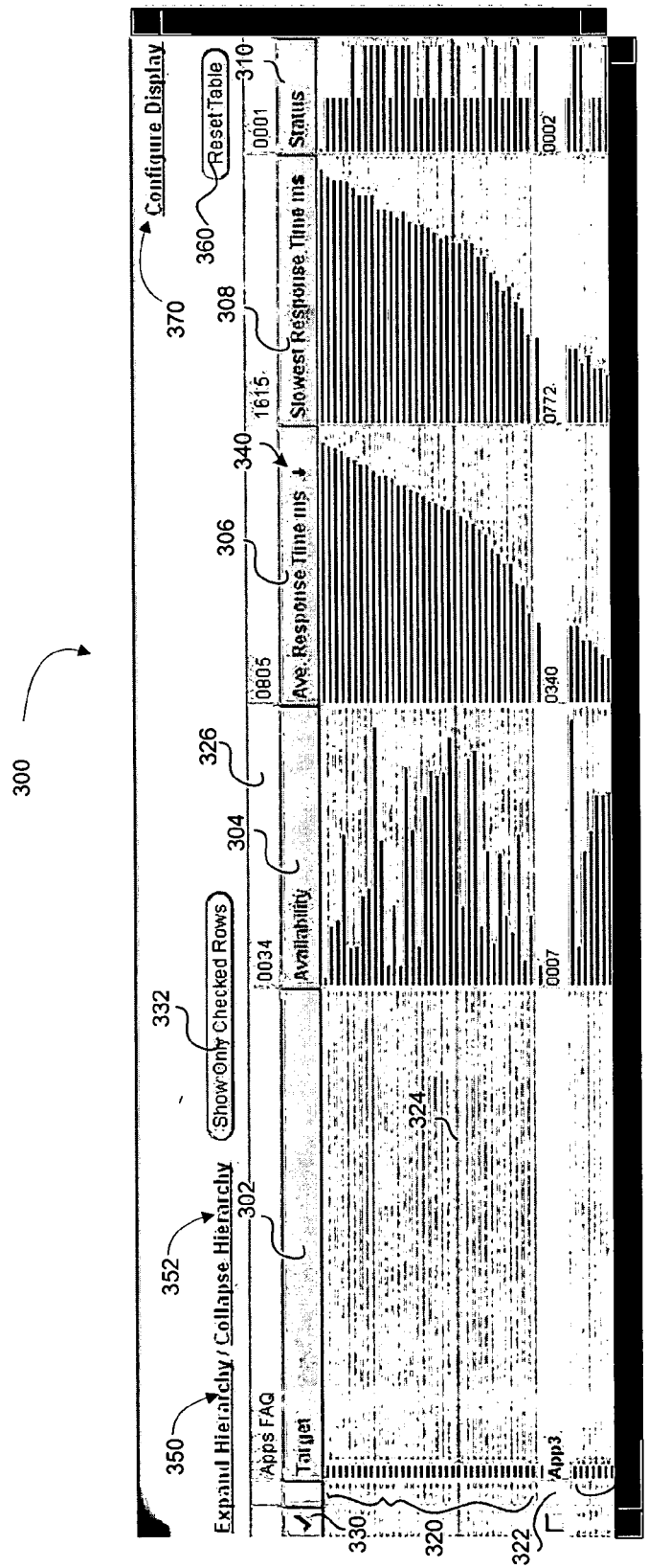
FIG. 3 illustrates an exemplary embodiment of a data viewer.

An exemplary embodiment of a data viewer that may be used to view multidimensional data is illustrated in FIG. 3. The data viewer 300 displays data in a table format. Attributes of data are displayed as columns 302, 304, 306, 308 and rows 320, 322 display related data. At the intersections of rows and columns are cells for displaying data values. In alternate embodiments, the related data may be displayed in columns, while attributes may be displayed in rows.

One of the columns 302 may be used to display data having multiple hierarchical levels having at least one data dimension in common. As illustrated in FIG. 3, column 302 is used to display web targets. Some of the web targets (parent) may have descendent targets. For instances, a web site may consist of multiple pages and/or applications that each have their own associated data. Data for the entire web site is at a higher hierarchical level than the data for the underlying pages/applications. One or more of the underlying pages may also have descendants. Another example of hierarchical data that could be displayed in a column 302 of a data viewer are product categories that have different hierarchical levels. A product category of writing instrument may have descendent categories of pencils, markers, pens (which may have descendants of ballpoint, roller ball, etc.). Numerous other examples of hierarchical data may also be displayed in a column 302 of the table.

In one view, the hierarchical data may be collapsed as shown in FIG. 3. When the hierarchy levels are collapsed, data is only displayed for a top hierarchy level (which may be configured as described below). Thus, in FIG. 3, data is displayed for each web target at the top hierarchy level. The displayed data includes the availability of web targets (displayed in column 304), the average response time of web targets (displayed in column 306), the slowest response time of web targets (displayed in column 308), and the status of the web targets (displayed in column 310).

Data for a first plurality of rows 320 is displayed in a graphical format. By way of example, the graphical format may comprise graphical bars. The graphical bars may take up less vertical screen area than textual data and may thus provide for the display of larger amounts of data on a single screen. Numerical data (e.g., availability 304, average response time 306, slowest response time 308) may be displayed so that the length of the bar indicates a larger number. Graphical bars (or other type of graphical format) may also be used for attributes having a pre-defined number of allowable values (yes/no, available/offline, etc.). For example, the status 310 of the web site target may be displayed as graphical bars with an available status equated to a first numerical value (with a first bar length) and an offline status equated to a second numerical value (with a second bar length). Alternately, graphical bars may be indented to indicate different allowable values. Character data may also be displayed in graphical format to indicate information, such as the starting letter of the character data. This may be accomplished in any number of ways. For instance, the length of a graphical bar may indicate the position in the alphabet of the starting character or graphical bars may be indented to indicate the position in the alphabet of the starting character.

Hierarchical data may also be displayed in graphical format to indicate the hierarchical position of the cell data. In one embodiment, graphical bars may be used to display hierarchical level information. As will be illustrated in later figures, the hierarchical level of the data may be indicated by indenting the graphical bars for lower hierarchical levels. Alternately, the hierarchy level may be indicated by a length of the graphical bar. In FIG. 3, none of the graphical bars in column 302 are indented, which indicates all of the displayed data is for the top hierarchy level. In other embodiments, the hierarchy level may be indicated by a length of a graphical bar, or other type of graphical format, such as color or thickness.

As illustrated by row 322, a second set of the data may be displayed in textual format. A user may select which data to display in the textual format. By way of example, the user may "single-click", "double-click", "right-click" or use another mechanism to indicate which rows of data should be displayed in textual format. The rows of data may or may not be contiguous to each other. The user may also be able to select to display one or more columns or one or more individual cells in textual format. The display of data in the textual format may cause the size of the cell(s) displayed in textual format to increase in order to display the text in a readable size. In some embodiments, in addition to the textual values, the graphical format may also be displayed (e.g., above/below/right/left of textual values or textual value may be displayed inside the graphical format).

A user may also be able to select to display the data for a row 324 in a status line 326. For instance, a user may position a cursor ("roll-over") on a row of data, which may cause the data viewer 300 to display the textual values of the data in status line 326. Within the table, the data may continue to be displayed in graphical format. The status line 326 could, in other embodiments, appear within the displayed table of data, at the bottom of the displayed data, or in another location.

As will be described in more detail with reference to FIG. 6, a user may be able to choose to limit the data displayed in the table to one or more selected rows. Thus, a filtering mechanism may be provided for the user to select which rows should be displayed. In one embodiment, the user may select rows by checking boxes in a column 330 and then clicking on a button 332 to display only the checked rows. Other mechanisms may also be used for the user to select which rows to display in the table.

Data viewer 300 may also provide the ability for a user to sort the data by a sort column 306. An indicator 340 may be displayed to show the current sort column. In some instances, indicator 340 may also indicate whether the data is sorted in ascending (e.g., up arrow indicator) or descending order (e.g., down arrow indicator). The sort column may be selected by "single-clicking" or "double-clicking" on a column header or by another mechanism. The sort order may be switched from ascending to descending (or visa versa) by selecting the sort column a second time. Data may be sorted to maintain the display of the hierarchical relationships of rows of data, so that hierarchical relationships may be easily viewed. Thus, the data may first be sorted at the highest hierarchical level. Data associated with lower hierarchical levels (descendent data) may then be sorted within their respective parent data category. In some embodiments, a secondary sorting capability may be provided, in which additional columns may also be selected to sort rows by the selected additional columns.

Other functionality may also be provided by data viewer 300. As one example, a mechanism 350 may be provided for the user to expand the hierarchy to display data at all hierarchical levels associated with column 302. Another mechanism 352 may be provided for the user to collapse all hierarchical levels and only display data at the top hierarchical level. A mechanism 360 (e.g., a button) may also be provided to reset the table to a default format. As will be described in further detail below with reference to FIG. 4, a mechanism 370 may also be provided for the user to configure the display. The user may activate mechanism 350, 352, 360, 370 by clicking, double-clicking, or any other appropriate method. It should be appreciated that in other embodiments, a data viewer 300 may not include all of the functionality described above and/or may include additional functionality.

Figure 4:
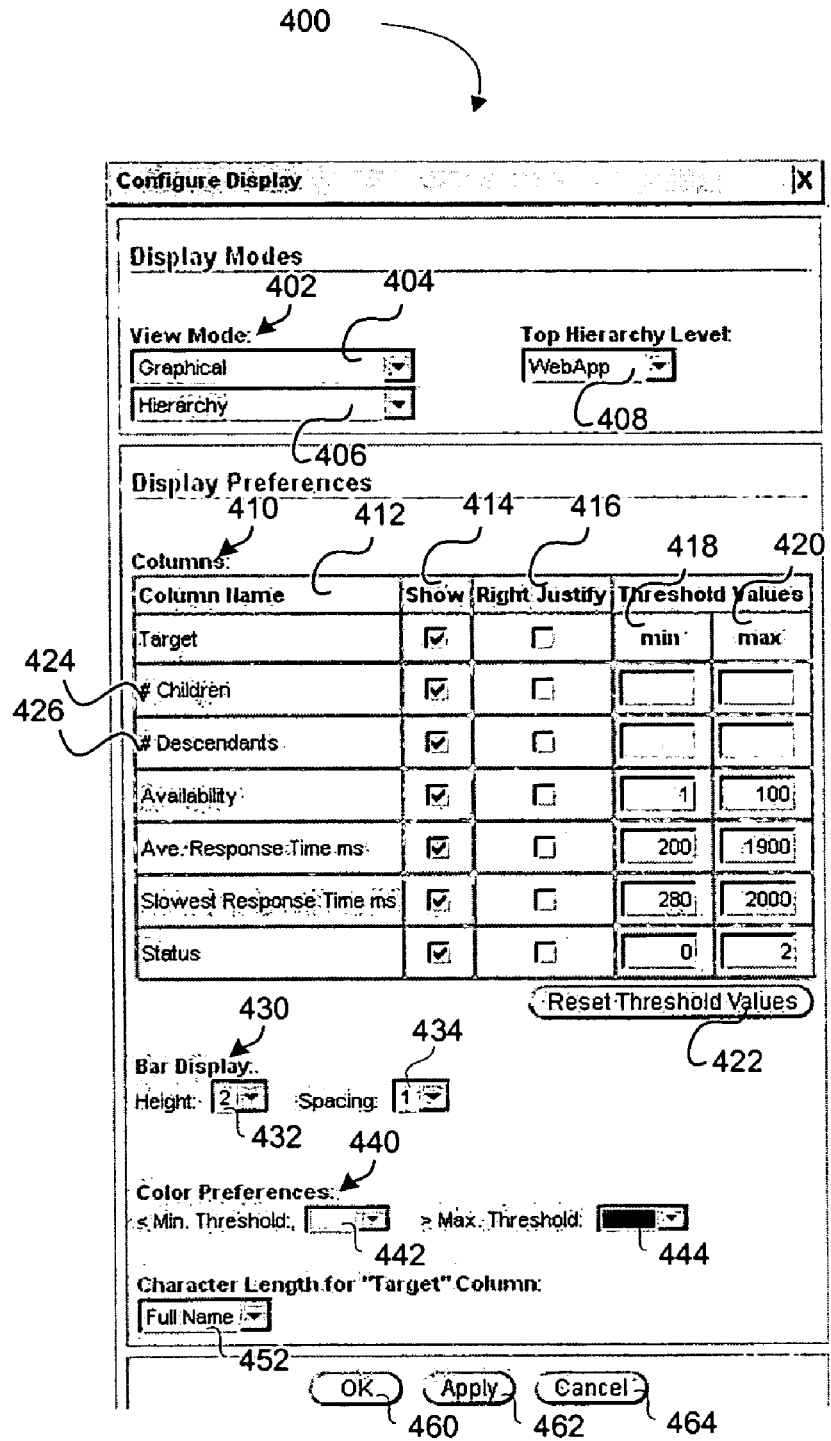
FIG. 4 illustrates an exemplary embodiment of a configuration interface that may be used to configure the display of data.

FIG. 4 illustrates an exemplary configuration interface, such as a window or menu, that may be invoked to allow the user to configure data display options. The configuration interface 400 may include one or more options 404, 406 to configure a display mode of the data viewer. By way of example, a first option 404 may be provided for the user to display data in graphical format, graphical format with textual values, or only textual values. Option 406 may allow the user to configure the data viewer to display the data in the hierarchical relationships or in a list format. If data is displayed in the hierarchical format, rows are displayed in accordance with their hierarchical levels and relationships. Thus, descendants are displayed consecutively with their parent rows (e.g., descendants of rows are displayed immediately following the parent row). The hierarchical relationships are maintained when the data is sorted. If the data is displayed in list format, the hierarchical relationships between rows are not maintained and data is displayed/sorted as if the hierarchy levels did not exist.

The configuration interface 400 may also provide an option for the user to configure the top hierarchy level 408 to display. Thus, the user may select to view only data at the top hierarchy level and below. Data at hierarchical levels above the selected top hierarchy level 408 is not displayed. In other embodiments, the user may select specific hierarchical levels to display, or the user may select to view only data at a bottom hierarchy level and above.

One or more option(s) may also be provided in configuration interface 400 to configure display preferences. As one example, the configuration interface may include an area 410 to configure the display of the data attributes. Area 410 may include the column (attribute) names 412 available for display. For each of the columns, the user may use an indicator, such as a checkbox or other suitable mechanism, to indicate whether to display 414 the attribute. Checkboxes or other mechanisms may also be provided to configure or change the justification 416 of one or more columns (e.g., set the justification as right justify). The justification option 416 may override a default justification (e.g., left justify). As will be illustrated with reference to FIG. 7, relationships between two attributes may be more easily perceived by displaying the attributes with opposite justification.

Additional options may also be provided to configure threshold values for one or more attributes. By way of example, options 418 (e.g., a mechanism such as a text box), may be provided for one or more of the attributes to configure a minimum threshold value. Data values that are below the minimum threshold may be displayed in a different format, such as a different color, highlighted, or otherwise visually convey that the data values fall below the minimum threshold value. Similarly, options 420 may be provided for one or more of the attributes to configure a maximum threshold value and values above the maximum threshold value may be displayed in a different format to visually convey the data value exceeds the configured maximum threshold value. In some embodiments, an option 418 may be provided to reset the threshold values to default values.

Configuration interface may also include one or more option(s) to display descendent information as attribute(s). FIG. 4 illustrates two possible options 424, 426 that may be provided to display descendent information as attributes. The first option 424 may be used to display the number of children of a row of data as an attribute. Child data is data at a hierarchical level directly below the hierarchical level of the parent data. A second option 426 may be used to display a total number of descendants at all hierarchical levels below the associated parent data. The display options of the descendent attributes 424, 426 may also be configurable similar to other attributes. Although FIG. 4 illustrates an embodiment in which threshold values are not configurable for the descendent attributes 424, 426, alternate embodiments are contemplated in which threshold values may be configured.

Configuration interface 400 may further include options to configure the display of graphical values 430. By way of example, in embodiments in which the graphical values are displayed as graphical bars, a first configuration option 432 may be provided to configure the height of the graphical bars. An additional option 434 may also be provided to configure the spacing between the graphical bars. In other embodiments, configuration interface 400 may include options to change the format of the graphical display and/or appropriately configure different types of graphical formats.

As previously described, threshold values may be configured for one or more attributes. An area may be provided to configure the format of data that is below minimum threshold values or above maximum threshold values. In one embodiment, area 440 may be used to configure the color to display values outside the threshold parameters. A first option 442 may be provided to select the color to display values below minimum thresholds and a second option 444 may be provided to select the color to display values above maximum thresholds. Alternately, the color preferences 442, 444 may be set differently for each attribute. In alternate embodiments, configuration interface may provide other types of formatting choices, such as highlighting or blinking, to display values outside thresholds. Additionally, in some embodiments, threshold values may be set for specific rows and/or hierarchy levels. In these cases, the threshold settings for rows may supercede those specified for a column, in those intersecting data elements defined by a row and column.

Configuration interface 400 further provides a configuration option 452 to configure the display length of character data when it is in non-graphical format. In the exemplary embodiment of web performance data, the character data is limited to the "target" attribute, but in alternate embodiments, additional attributes may also be character data. A user may be able to select from a drop-down list or other mechanism to display the character data full length, or other lengths, such as 5, 10, or 15 characters. The chosen option may change the displayed width of columns associated with character data. By configuring the display length of character data, users may decide between seeing more detailed information (full character name) at the expense of more screen space (possibly necessitating scrolling) or less detailed information with less screen space taken up by the character data.

After a user has completed use of the configuration interface 400, a mechanism 460 (e.g., an "OK" button) may be provided to apply all the changes made, close the configuration interface, and re-display the data using the selected configuration options. A second mechanism 462 (e.g., an "Apply" button) may be provided to apply the changes made, but continue the display of configuration interface 400 for potential additional changes. A third mechanism 464 (e.g., a "Cancel" button) may be provided to undo any configuration changes made, close the configuration interface 400 and return to the previous display of data.

It should be appreciated that in alternate embodiments, configuration interface 400 may include fewer, additional, or different options than those discussed with reference to FIG. 4. As one example, options may be provided in configuration interface 400 or a separate configuration interface to configure hierarchy levels and/or the hierarchy column. Other option(s) may be provided to format or configure the graphical display of data. By way of example, a user may be able to select whether to display the hierarchical values and/or character data in graphical format by indenting or by changing the length of a graphical bar. Other configuration options to configure the display and formatting of data are also contemplated.

Figure 5:
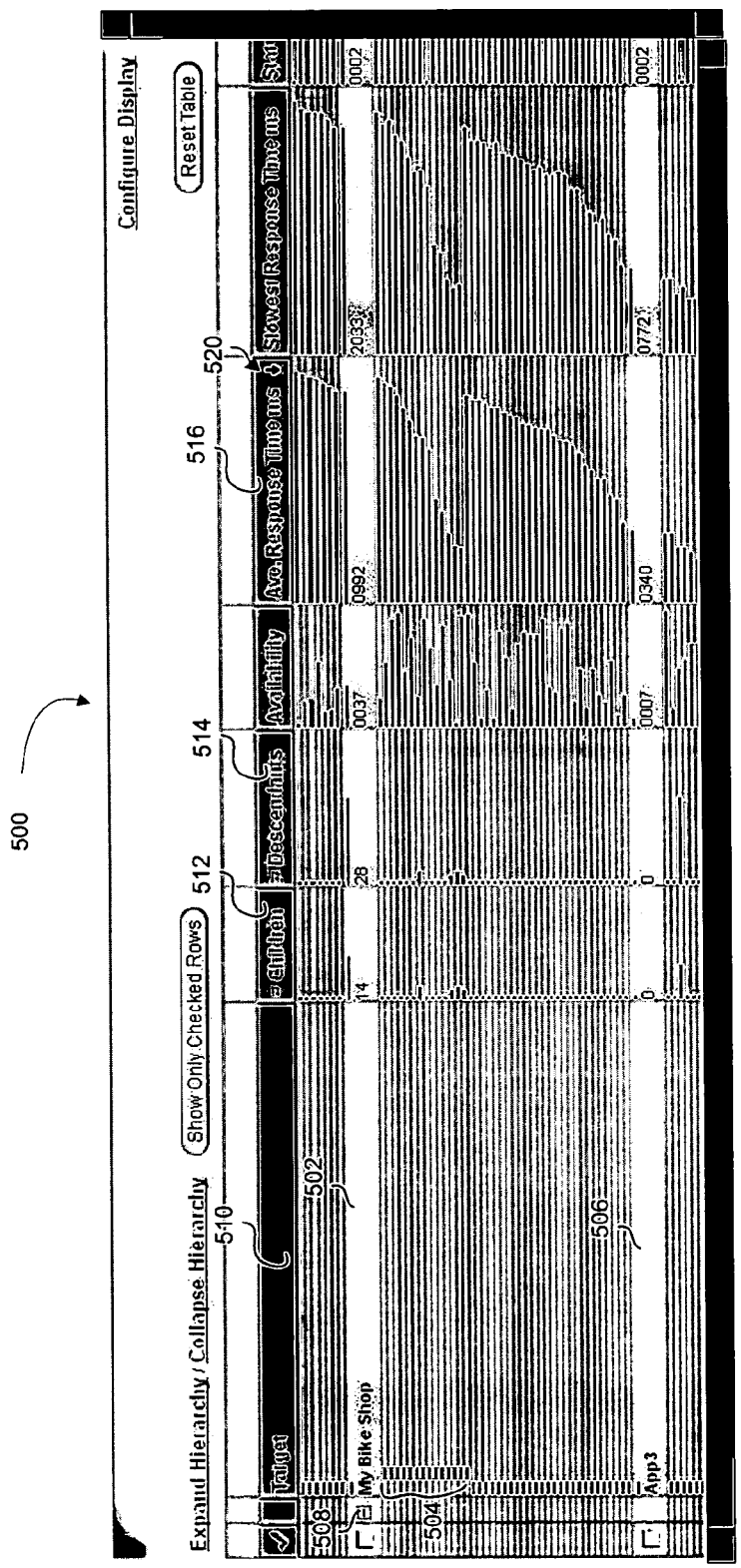
FIG. 5 illustrates a second exemplary display of data using a data viewer.

FIG. 5 illustrates another view 500 of data that may be displayed using a data viewer. In this view, the hierarchical levels have been expanded for row 502 having a target attribute "My Bike Shop". Thus, data associated with lower hierarchical levels of the hierarchical column "Target" 510 are displayed in rows 504. Each of the displayed rows 504 is at one hierarchical level below "My Bike Shop", as can be seen by the indented position of the graphical display of the data values for the target attribute in these rows 504.

Descendent information is displayed as attributes in columns 512, 514. Column 512 displays the number of children (direct descendents that are at one hierarchical level below the associated row data) and column 514 displays the total number of descendents. "My Bike Shop" displayed in row 502 has 14 children (displayed in rows 504) and 28 total descendents. As can be appreciated, one or more of the target data values in rows 504 also has descendents.

A mechanism 508 is displayed to provide the user the ability to collapse the display of the hierarchical data, so that descendent rows 504 of row 502 are not displayed. Mechanism 508 may also indicate (e.g., by a minus sign) row 502 has been expanded to display descendent rows 506. If mechanism 508 is activated to collapse the display of hierarchical data, the display of mechanism may change to indicate that descendent data exists (e.g., changed to a plus sign) and mechanism 508 may then be used to expand the data to display the descendents 504. In the illustrated embodiment, mechanisms are not displayed to indicate whether a row has descendent data when the data is displayed in graphical format (as currently illustrated by rows 504). Mechanisms, such as mechanism 508, are displayed when the data is in textual format (row 502). A mechanism is not displayed for row 506 (associated with target attribute value "App3") as it has no descendents. This may provide for the conservation of screen space. However, alternate embodiments may display or otherwise indicate which rows have descendent data when the data is in graphical format. Additionally, in some embodiments, the expansion of a row of data to display data at lower hierarchy levels may result in the expansion of all descendents, not just child descendents.

The data displayed in data viewer 500 is currently being sorted in descending order by the average response time attribute 516 as indicated by an indicator 520 (e.g., down arrow) 520 displayed in the header of column 516. Data is sorted according to hierarchical levels. First, the data at the top hierarchy level is sorted by the sort column 516. Descendent data at hierarchy levels below the top hierarchy level are then sorted within their respective parent hierarchy level. Thus, the display of the hierarchical relationships between rows of data is maintained. In FIG. 5, all data rows at the top target hierarchy level, including 502, 506 are sorted by the average response time 516. Rows 504 are sorted by average response time 516 within their parent target of "My Bike Shop" associated with row 502. Optionally, a second column header could be selected as a secondary sort key, which would specify sorting in case of ties on the preceding sort.

FIG. 6 illustrates a filtered view 600 of data that may be displayed using a data viewer. Displayed data is limited to rows 610. Rows 610 may have been selected for display by a user by using a mechanism, such as a checkbox, to indicate the selected rows and then using another mechanism, such as button 602 to select to display only the checked rows. Other suitable mechanisms may also be used to indicate which data should be displayed in the filtered view 600. A mechanism, such as button 630, may also be provided to reset the displayed data to include the data excluded by the filtered view 600.

The selected data 610 includes the data associated with target "My Bike Shop" (row 612) and two rows 612, 614 having descendent data. A minus sign 622 is displayed to indicate the data associated with row 612 (target "My Bike Shop") has descendent data associated with it and that the data display is currently expanded to display the descendent data. By clicking on the minus sign 622, the user may collapse the display of the descendent data associated with "My Bike Shop". Similarly, a plus sign 624 is displayed to indicate the data associated with row 614 (target "Storefront Page", which is a child of "My Bike Shop") has associated descendent data and that the descendent data is not currently displayed. A user may click on the plus sign 624 to expand the displayed data to include the descendent data. It should be appreciated that alternate mechanisms may also be used to expand/collapse the display of descendent data and/or to indicate whether the descendent data is currently displayed.

Figure 7:
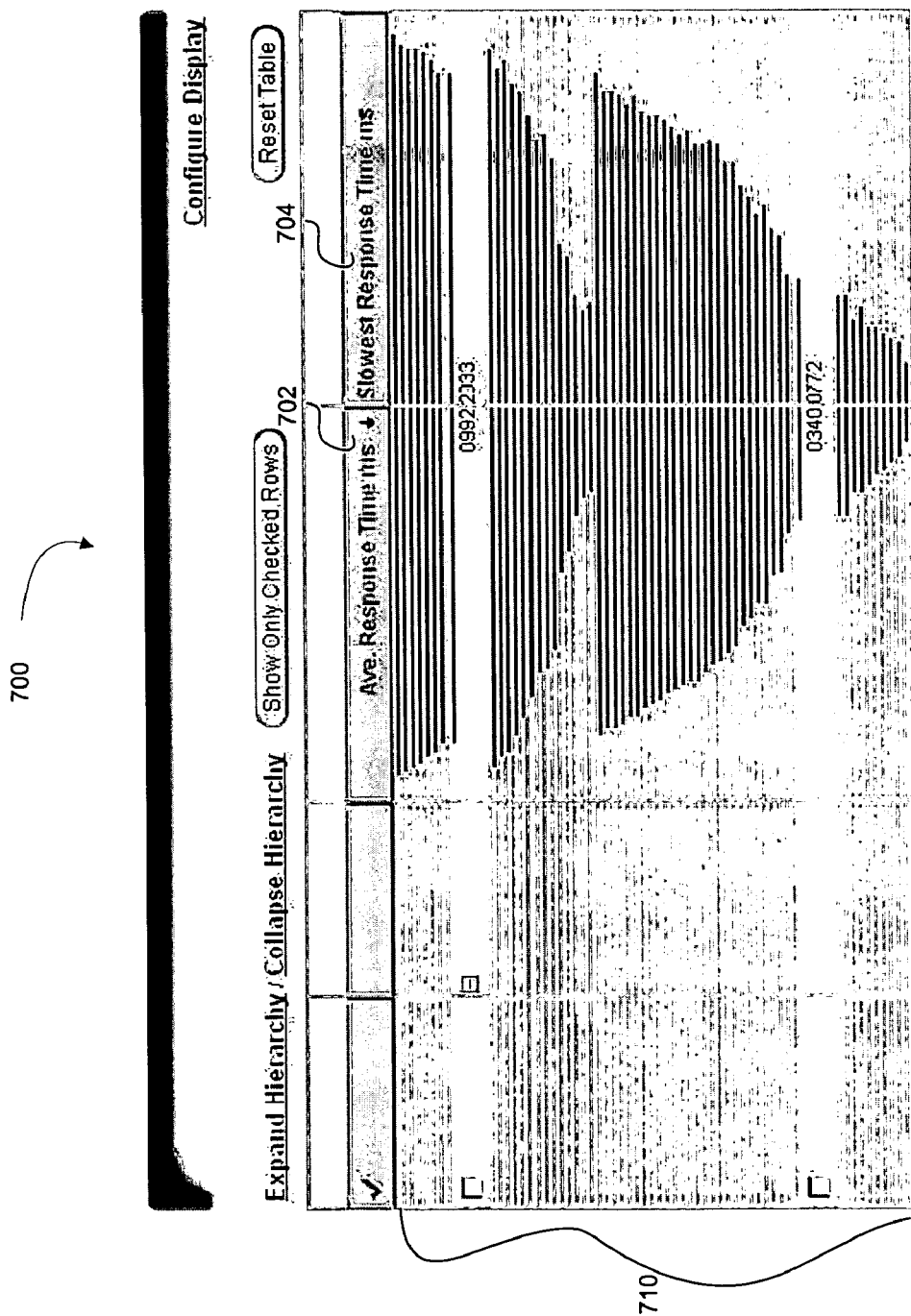
FIG. 7 illustrates a fourth exemplary display of data using a data viewer.

FIG. 7 illustrates another view 700 of data that may be displayed using a data viewer. View 700 includes a column 702 displaying values for the average response time attribute for a plurality of rows of associated data 710. A second column 704 is used to display the slowest response time attribute values. The average response time 702 values are right justified and the slowest response time values displayed in column 704 are left justified.

For the data displayed as graphical bars, the reverse justification of columns 702, 704 may produce a tree effect for the data values. This type of display may facilitate the perception of relationships between the data values of these columns. In the example data of FIG. 7, the reverse justification may have assisted a user to seeing that a high average response time (values in column 702) is generally correlated to a high slowest response time (values in column 704) and visa versa. It should be appreciated that additional columns may also displayed, some of which may also be displayed using reverse justification.

Figure 8:
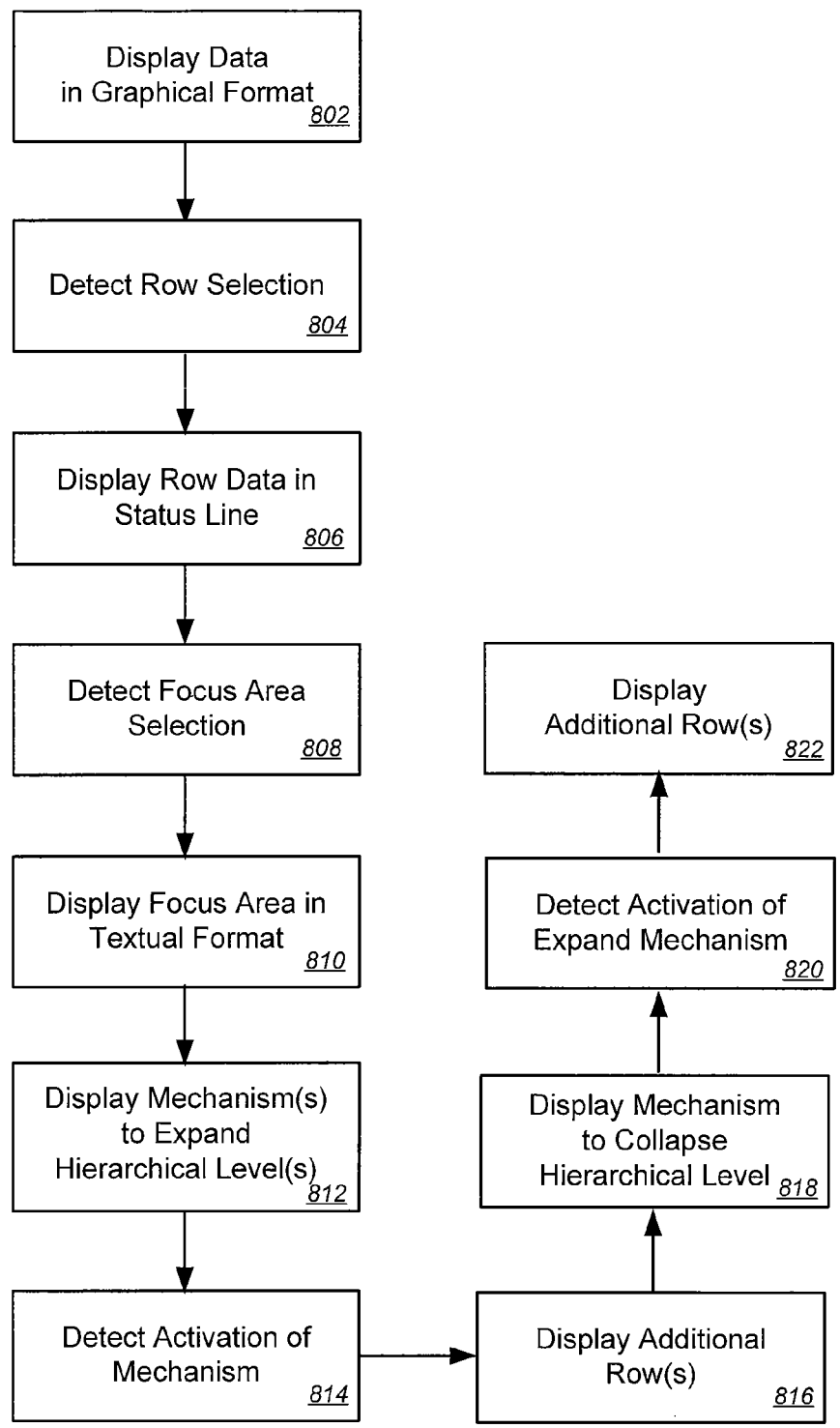
FIG. 8 is a flow diagram illustrating an exemplary method of using a data viewer to display data.

FIG. 8 illustrates an exemplary method of interacting with a data viewer to display data. The method may begin by displaying 802 multidimensional data having multiple hierarchy levels. The data values may be displayed in a table format having a plurality of rows for displaying associated data (e.g., a data record), a plurality of columns for displaying data attributes, and a plurality of cells for displaying the data values. At least a portion of the data values are displayed in a graphical format (e.g., graphical bars). One of the columns may include data having at least two hierarchical levels. The graphical format of the data in this column may indicate the hierarchy level of the data value (e.g., by indenting graphical bars or increasing the length of graphical bars to indicate a lower hierarchy level). In some embodiments, when the data is initially displayed 802, the display may be limited to the data rows having values in the hierarchical column at a top hierarchy level.

The selection of a row of data may be detected 804. A user may have selected a row by "clicking" on a row of data. One or more of the attribute values for the data may be displayed in graphical format. Upon detection 804 of the data selection, the data values may be displayed 806 in a status line in textual format.

The method may also include the detection 808 of a focus area selection (e.g., by detecting a "roll-over" or other mechanism activated by a user to select a focus area). The data selected for focus may have been displayed 802 in graphical format. Upon detection 808 of the focus area selection, the data associated with the selected focus area may be re-displayed 810 in textual format. In some instances, the size of the cell or row displaying the data values may increase to accommodate the display of the textual data in a readable size. In other embodiments, this displayed row may appear at the bottom of, or floating over the displayed graphical table image. Thus, in some cases, the entire table image or other portions of the table image may need to be re-displayed.

One or more of the rows of data selected in the focus area may have associated descendent data (data at a lower hierarchy level than the value in the row's hierarchical column that shares at least one common data dimension with the value). A mechanism 812 may be displayed for each of these rows to allow a user to view the descendent data. Alternately, mechanism(s) may be displayed for all rows having descendent data, regardless of whether the data in the row is displayed in textual or graphical format.

An activation of one of the mechanisms one of the rows is detected 814. The additional descendent data associated with the row having the activated mechanism is displayed 816. By way of example, the descendent data rows may be displayed as rows immediately below the parent data row. In some embodiments, the activation of the mechanism may result in only the display of child data rows (e.g., data at a hierarchical level immediately below the parent data). The mechanism associated with the parent row may be changed to display 818 a mechanism to collapse the display and remove the descendent rows of data from the displayed data.

The method may further include the detection 820 of the activation of an expand all hierarchy levels mechanism. This may result in the display 822 of all additional rows of data at all hierarchy levels. These additional rows may be displayed 822 immediately following the parent rows to indicate the hierarchical relationships between the rows. By way of example, the descendent data may be displayed 822 as indented graphical bars or other symbols, the indented position indicating the hierarchical level of the descendent data.

It should be appreciated that in alternate embodiments, a great number of variations may be made to the exemplary method described above. For instance, the method may not include all of the illustrated blocks or the blocks may be performed in a different order. As another example, additional or different interactions may occur that use the same or additional functionality provided by a data viewer.

Figure 9:
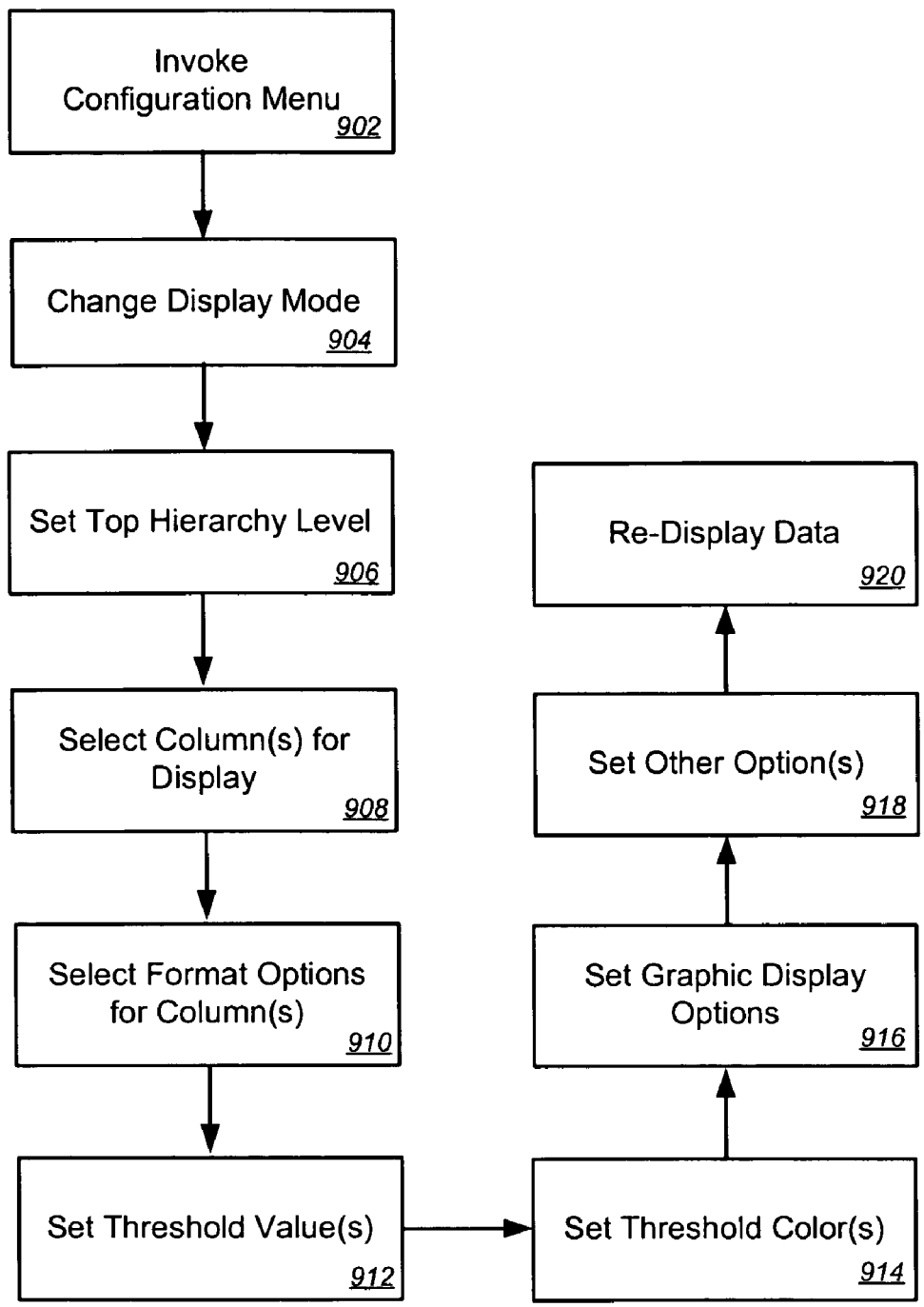
FIG. 9 is a flow diagram illustrating an exemplary method that may be used to configure a data viewer.

FIG. 9 illustrates an exemplary method that may be used to configure a data viewer. The method may begin by invoking 902 a configuration interface. The invocation 902 of the configuration interface may be in response to a user request to configure the display of the data. The configuration interface includes a plurality of configuration options to change the manner in which data in the data viewer is displayed.

Selection(s) may then be received to change one or more of the configuration options. One of the received changes may be to change 904 a display mode configuration option. By way of example, the display mode configuration selection may be to display the data previously displayed in the graphical format in a graphical format with textual values (e.g., displaying textual values above/below, left/right, or within graphical format). Another configuration option may be received to set 906 the top hierarchy level for the displayed data. This option may result in the display of data including only the data at hierarchical levels at or below the configured top hierarchy level. In other embodiments, configuration options may allow the user to set specific hierarchy levels for display, or may allow display of data at a specified or higher level of hierarchy.

The method may also include receiving configuration option(s) selecting 908 the columns (data attributes) to be displayed in the data viewer. Thus, columns associated with data attributes may be added or removed from the display according to the preferences of the user. In some instances, the user may also select 908 to display columns indicating a number of children and/or descendents of data. Format options (e.g., justification) for columns may also be selected 910 using configuration interface.

Additional configuration options may be received to set 912 threshold values for data. Maximum and/or minimum threshold values may be set 912 for one or more of the attributes. Data that exceeds maximum threshold values or is less than minimum threshold values may be displayed in a different format to indicate the data is outside a threshold value. In one embodiment, the data may be displayed in a different color. Thus, a configuration option may be received to set 914 the color(s) to display data that falls outside threshold values. In alternate embodiments, different or additional formatting options may be set to display values outside threshold parameters.

Graphic display option(s) may also be set 916. For instance, graphic display option(s) may be set to indicate a graphical format to use to display graphical values. In some embodiments, the graphical format may be horizontal graphical bars. In these embodiments, graphical display option(s) may be set to change the vertical height and/or spacing of the graphical bars. Thus, the user may decide whether to display larger amounts of data (using smaller vertical heights and spacing) or to display less data that may possibly be more comprehensible to a user, but may necessitate scrolling to view all data.

Additional configuration option(s) may also be set 918, such as option(s) previously described with reference to FIG. 4. The data may then be re-displayed 920 in accordance with the configuration options selected 904-918.

In the foregoing description, for the purposes of illustration, methods were described in a particular order. It should be appreciated that in alternate embodiments, the methods may be performed in a different order than that described. Additionally, the methods may include fewer, additional, or different blocks than those described. The methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of displaying non-character based graphical representations of multidimensional data, the method comprising:
displaying multidimensional data in a table format comprising a plurality of cells arranged in a plurality of rows and a plurality of columns, a designated column of the plurality of columns corresponding to a common dimension, such that the cells of each row share a value of the common dimension in the designated column, the value of each cell of the common dimension having an associated hierarchical level according to a parent or child relationship between the cell of the designated column and at least one other cell of the designated column; and
displaying a hierarchy column having a plurality of cells arranged in rows, such that each cell of the hierarchy column visually corresponds to a respective cell of the common dimension, displaying the hierarchy column comprising displaying, in each cell of the hierarchy column, the hierarchical level associated with the respective cell of the common dimension using a non-character and non-numerical based graphical representation, wherein displaying the non-character and non-numerical based graphical representation of the respective hierarchical level of the cells comprises displaying graphical bars, the graphical bars indented to indicate the respective hierarchical level of the data in the respective rows containing each of the cells and wherein each cell of the hierarchy column comprises one of the graphical bars.

2. The method of claim 1, further comprising:
detecting an activation of a mechanism associated with the plurality of rows, the plurality of rows having cell data corresponding to a first hierarchical level; and
displaying one or more of a plurality of rows having data corresponding to a second hierarchical level that is a descendant of the first hierarchical level.

3. The method of claim 2, further comprising displaying a second mechanism associated with the plurality of rows to remove at least one of the rows of the plurality of rows from the displayed data.

4. The method of claim 2, further comprising displaying the data for a set of the plurality of cells in a textual format.

5. The method of claim 4, further comprising:
before displaying the data for the set, displaying the data for the set in a graphical format; and
wherein displaying the data for the set comprises detecting a selection of the set, and re-displaying the table to display the set in the textual format.

6. The method of claim 4, wherein the set includes non-contiguous rows.

7. The method of claim 4, further comprising:
detecting a selection of a row in the set; and
displaying the data associated with the selected row in a textual format in a status line.

8. The method of claim 5, further comprising invoking a configuration interface having a plurality of configuration options for a user to change a configuration of the displayed data.

9. The method of claim 8, further comprising:
receiving a selection from the user to change a display mode configuration option; and
re-displaying the data in accordance with the selection.

10. The method of claim 8, further comprising:
receiving a configuration option to display the data in the set in the graphical format with textual values; and
re-displaying the data in the set in the graphical format with the textual values.

11. The method of claim 8, further comprising:
receiving a configuration option to set a maximum threshold value for data in a second column; and
displaying the data in the second column which exceed the maximum threshold value in a different format.

12. The method of claim 8, further comprising:
receiving a configuration option to set a minimum threshold value for data in a second column; and
displaying the data in the second column which are less than the minimum value in a different format.

13. The method of claim 8, further comprising:
receiving a configuration option to display the data in a list format; and
re-displaying the data in the list format.

14. The method of claim 13, further comprising sorting the redisplayed data by a sort column without maintaining hierarchical relationships between the rows.

15. The method of claim 8, wherein the first hierarchical level is a top hierarchical level, the method further comprising:
receiving a configuration option to change the first hierarchical level to a different hierarchical level that is lower than the top hierarchical level; and
re-displaying the data without displaying data at any hierarchical level above the first hierarchical level.

16. The method of claim 8, further comprising:
receiving a configuration option to remove a column from the displayed data; and
re-displaying the table without the removed column.

17. The method of claim 8, further comprising:
receiving a configuration option to display a second column, each cell in the second column indicating for each row, a number of descendents at a lower hierarchical level than the respective row; and
displaying the second column.

18. The method of claim 8, wherein the graphical format comprises a bar and the plurality of configuration options include an option to change the height of the bar.

19. The method of claim 8, wherein the plurality of configuration options include an option for each of the columns to right justify the data in the column.

20. The method of claim 2, further comprising:
receiving a selection from a user to expand one or more of the at least two hierarchical levels; and
displaying one or more additional rows in the table, the plurality of rows having data in the column at the hierarchical level lower than a top hierarchical level, each of the plurality of rows associated with a row having data in the column at a higher hierarchical level, the associated rows displayed to indicate a hierarchical relationship between rows of data.

21. The method of claim 1, further comprising:
receiving a selection from a user to collapse at least two hierarchical levels; and
re-displaying the table to include only the rows having data in the column at a top hierarchical level.

22. The method of claim 21, further comprising:
receiving a sort column selection;
sorting the data at one of the at least two hierarchical levels in accordance with the sort column selection; and
displaying the sorted data to maintain a display of a hierarchical relationship between rows of data.

23. The method of claim 1, further comprising:
receiving a selection of one or more rows; and
re-displaying the table to include only the selected rows.

24. A computer system comprising:
a central processing unit (CPU);
a display device, communicatively coupled with the CPU; and
memory, communicatively coupled with the CPU; the memory including a set of instructions executable by the CPU, the set of instructions comprising:
instructions for displaying, on the display, multidimensional data in a table format, the table format comprising a plurality of cells arranged in a plurality of rows and a plurality of columns, each column corresponding to a dimension of the multidimensional data, a designated column of the plurality of columns corresponding to a common dimension, such that the cells of each row represent the multidimensional data sharing a value of the common dimension in the designated column, the value of each cell of the common dimension having an associated hierarchical level according to a parent or child relationship between the cell of the designated column and at least one other cell of the designated column, and
a hierarchy column having a plurality of cells arranged in rows, such that each cell of the hierarchy column visually corresponds to a respective cell of the common dimension, and each cell of the hierarchy column comprises a non-character and non-numerical based graphical representation of the hierarchical level associated with the respective cell of the common dimension, wherein displaying the non-character and non-numerical based graphical representation of the respective hierarchical level of the cells comprises displaying graphical bars, the graphical bars indented to indicate the respective hierarchical level of the data in the respective rows containing each of the cells and wherein each cell of the hierarchy column comprises one of the graphical bars.

25. The computer system of claim 24, further comprising a data storage, communicatively coupled with the processor, to store the data.

26. One or more machine-readable mediums for displaying non-character based and non-numerical based graphical representations of multidimensional data, having stored thereon a set of instructions executable by a machine, the set of instructions comprising:
instructions for displaying, on a display, multidimensional data in a table format, the table format comprising a plurality of cells arranged in a plurality of rows and a plurality of columns, one or more cells of the plurality of cells displaying numerical data or values graphically without the use of characters or numbers, another one or more cells of the plurality of cells displaying data with characters or numbers; and
instructions for displaying a hierarchy column adjacent to the plurality of columns-indicating at least two hierarchical levels of the multidimensional data, the at least two hierarchical levels comprising a parent hierarchical level and a child hierarchical level, each cell of the hierarchy column being associated with a respective hierarchical level and displaying a non-character and non-numerical based graphical representation of the respective hierarchical level of the cell, wherein displaying the non-character and non-numerical based graphical representation of the respective hierarchical level of the cells comprises displaying graphical bars, the graphical bars indented to indicate the respective hierarchical level of the data in the respective rows containing each of the cells and wherein each cell of the hierarchy column comprises one of the graphical bars.

27. The method of claim 1, wherein each cell in the plurality of cells has a graphical format that indicates a value of that cell.

28. The method of claim 1, wherein the graphical representation of data at the parent row comprises a graphical bar having a maximum length derived from a predetermined minimum value and a predetermined maximum value.

29. The method of claim 1, further comprising sorting data by a sort column while maintaining hierarchical relationships between rows.

30. The method of claim 1, further comprising:
identifying subsets of rows, each including descendants of a corresponding parent row of the plurality of rows;
calculating corresponding numerical data or values for each row of each subset of rows;
displaying, in a first column, non-character or non-numerical based graphical representations of the corresponding numerical data or values at each parent row which represents a grouping or aggregation of the corresponding numerical data or values of the corresponding descendant subset of rows;
and
displaying, in a second column, a non-character or non-numerical based graphical representation of the corresponding numerical data or values of the subsets of rows.

31. The computer system of claim 24, the memory including the set of instructions executable by the CPU, the set of instructions further comprising:
   instructions for identifying subsets of rows, each including descendants of a corresponding parent row of the plurality of rows;
   instructions for calculating corresponding numerical data or values for each row of each subset of rows;
   instructions for displaying, in a first column, non-character or non-numerical based graphical representations of the corresponding numerical data or values at each parent row which represents a grouping or aggregation of the corresponding numerical data or values of the corresponding descendant subset of rows;
   and
   instructions for displaying, in a second column, a non-character or non-numerical based graphical representation of the corresponding numerical data or values of the subsets of rows.

32. The one or more machine-readable mediums of claim 26, the set of instructions further comprising:
   instructions for identifying subsets of rows, each including descendants of a corresponding parent row of the plurality of rows;
   instructions for calculating corresponding numerical data or values for each row of each subset of rows;
   instructions for displaying, in a first column, non-character or non-numerical based graphical representations of the corresponding numerical data or values at each parent row which represents a grouping or aggregation of the corresponding numerical data or values of the corresponding descendant subset of rows;
   and
   instructions for displaying, in a second column, a non-character or non-numerical based graphical representation of the corresponding numerical data or values of the subsets of rows.

* * * * *

UNITED STATES PATENT AND TRADEMARK OFFICE
CERTIFICATE OF CORRECTION

| | | |
|---|---|---|
| PATENT NO. | : 8,060,817 B2 | |
| APPLICATION NO. | : 10/985531 | |
| DATED | : November 15, 2011 | |
| INVENTOR(S) | : Goldberg et al. | |

It is certified that error appears in the above-identified patent and that said Letters Patent is hereby corrected as shown below:

IN THE SPECIFICATIONS:

In column 4, line 13, delete "ore" and insert -- or --, therefor.

In column 4, line 28, delete "Sybase™ IBM™" and insert -- Sybase™, IBM™ --, therefor.

IN THE CLAIMS:

In column 14, line 58, in Claim 14, delete "redisplayed" and insert -- re-displayed --, therefor.

In column 16, line 27, in Claim 26, delete "columns-indicating" and insert -- columns indicating --, therefor.

Signed and Sealed this
Thirty-first Day of January, 2012

David J. Kappos
*Director of the United States Patent and Trademark Office*